United States Patent [19]

Chen

[11] 4,258,175

[45] Mar. 24, 1981

[54] PROCESS FOR PREPARING AN ARYL ETHER

[75] Inventor: Sun-Mao Chen, Ann Arbor, Mich.

[73] Assignee: Velsicol Chemical Corporation, Chicago, Ill.

[21] Appl. No.: 55,255

[22] Filed: Jul. 6, 1979

[51] Int. Cl.³ .................. C08G 65/40; C08G 65/42
[52] U.S. Cl. ........................ 528/217; 525/1; 525/3; 528/125; 528/126; 528/128; 528/174; 528/205; 528/212; 528/214; 528/219; 568/315; 568/367; 568/375; 568/376; 568/377; 568/380; 568/381; 568/637; 568/641
[58] Field of Search .......... 528/125, 126, 128, 174, 528/205, 212, 214, 217, 219; 568/637, 641, 315, 367, 375, 376, 377, 380, 381; 260/607, 609

[56] References Cited
U.S. PATENT DOCUMENTS

| | | | |
|---|---|---|---|
| 2,060,715 | 11/1936 | Arvin | 528/219 |
| 3,069,386 | 12/1962 | Barclay, Jr. | 528/219 |
| 4,136,087 | 1/1979 | Williams et al. | 528/219 |
| 4,163,833 | 8/1979 | Johnson | 528/219 |

*Primary Examiner*—Lester L. Lee
*Attorney, Agent, or Firm*—Dietmar H. Olesch; Robert J. Schwarz

[57] ABSTRACT

There is provided a process for preparing a compound of the formula

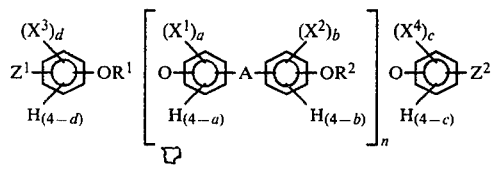

wherein $X^1$, $X^2$, $X^3$, and $X^4$ are independently selected from the group consisting of fluorine, chlorine, bromine and iodine; n is an integer of from 1 to about 100; a, b, c, and d are each integers of from about 0 to about 4; $Z^1$ and $Z^2$ are independently selected from the group consisting of halogen and alkyl of from about 1 to about 15 carbon atoms; $R^1$ and $R^2$ are independently selected from the group consisting of alkylene containing from about 1 to about 12 carbon atoms, alkylenyl containing from about 2 to about 12 carbon atoms, cycloalkylene of the formula

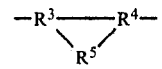

wherein $R^3$, $R^4$ and $R^5$ are independently selected from the group consisting of alkylene of from about 1 to about 5 carbon atoms, and cycloalkylenyl of the formula

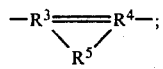

and A is selected from the group consisting of $R^3CR^4$,

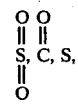

and O; comprising the steps of:
(a) reacting a halogenated diphenoxy compound of the formula

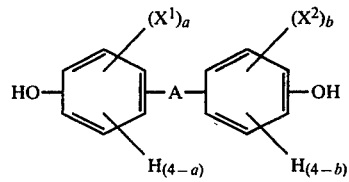

with from about 1 to about 20 moles per mole of said halogenated diphenoxy compound of an alkylene dihalide of the formula $X^1R^1X^2$ at a temperature of from about 50 to about 200 degrees centigrade for from about 30 to about 300 minutes in the presence of an inorganic base, whereby a halogenated aryl ether is produced; and
(b) reacting the halogenated aryl ether produced in step (a) with a halogenated phenol of the formula

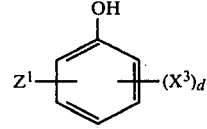

at a temperature of from about 50 to about 200 degrees centigrade in the presence of an inorganic base for from about 1 to about 10 hours, wherein from about 0.1 to about 2.0 moles of said halogenated phenol per mole of said halogenated diphenoxy compound are charged to the reaction mixture and reacted.

10 Claims, No Drawings

PROCESS FOR PREPARING AN ARYL ETHER

FIELD OF THE INVENTION

A process for preparing an aryl ether is disclosed.

DESCRIPTION OF THE PRIOR ART

Acrylonitrile-butadiene-styrene (ABS) thermoplastics offer a good balance of physical and mechanical properties such as good abuse resistance, heat resistance, moldability, stain resistance, chemical resistance, and surface hardness. Because of their properties and their moderate cost, they have been chosen for use in a wide range of applications. These plastics are derived from acrylonitrile, butadiene, and styrene. The general chemical structure for them is

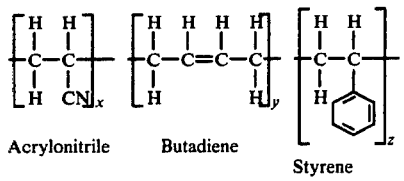

wherein x, y, and z, which may be the same or different, are from about 10 to about 1,500.

Certain ethers are effective in imparting flame retardancy to ABS plastics. However, when they are prepared by prior art processes, they are substantially incompatible with the ABS plastics.

It is an object of this invention to provide a process for preparing substantially non-blooming ethers.

DETAILED DESCRIPTION OF THE INVENTION

In accordance with this invention, there is provided a process for preparing a compound of the formula

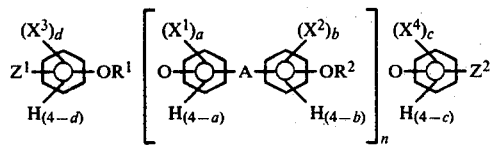

wherein $X^1$, $X^2$, $X^3$ and $X^4$ are independently selected from the group consisting of fluorine, chlorine, bromine, and iodine; n is an integer of from 1 to about 100; a, b, c, and d are each integers of from about 0 to about 4; $Z^1$ and $Z^2$ are independently selected from the group consisting of halogen and alkyl of from about 1 to about 15 carbon atoms; $R^1$ and $R^2$ are independently selected from the group consisting of alkylene containing from about 1 to about 12 carbon atoms, alkylenyl containing from about 2 to about 12 carbon atoms, cycloalkylene of the formula

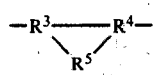

wherein $R^3$, $R^4$ and $R^5$ are independently selected from the group consisting of alkylene of from about 1 to about 5 carbon atoms, and cycloalkylenyl of the formula

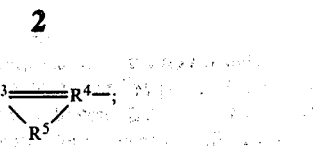

and A is selected from the group consisting of $R^3CR^4$,

and O; comprising the steps of:

(a) reacting a halogenated diphenoxy compound of the formula

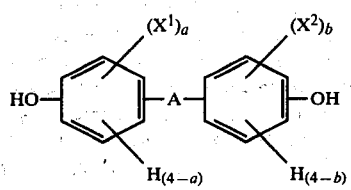

with from about 1 to about 20 moles per mole of said halogenated diphenoxy compound of an alkylene dihalide of the formula $X^1R^1X^2$ at a temperature of from about 50 to about 200 degrees centigrade for from about 30 to about 300 minutes in the presence of an inorganic base, whereby a halogenated aryl ether is produced; and (b) reacting the halogenated aryl ether produced in step (a) with a halogenated phenol of the formula

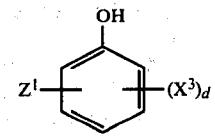

in the presence of an inorganic base at a temperature of from about 50 to about 200 degrees centigrade for from about 1 to about 10 hours, wherein from about 0.1 to about 2.0 moles of said halogenated phenol per mole of said halogenated diphenoxy compound are charged to the reaction mixture and reacted.

In one preferred embodiment, $Z^1$ and $Z^2$ are independently selected from the group consisting of halogen. In this embodiment it is preferred that A be $R^3$—C—$R^4$ and $R^1$ and $R^2$ be selected from the group consisting of alkylene containing from about 1 to about 12 carbon atoms; it is more preferred that $Z^1$, $Z^2$, $X^1$, $X^2$, $X^3$, and $X^4$ be bromine, that a, b, c, and d be from about 1 to about 4, and that $R^1$ and $R^2$ be alkylene of from about 1 to about 5 carbon atoms.

In another preferred embodiment, $Z^1$ and $Z^2$ are independently selected from the group consisting of alkyl containing from about 1 to about 15 carbon atoms. In this embodiment it is preferred that A be $R^3$—C—$R^4$ and $R^1$ and $R^2$ be selected from the group consisting of alkylene containing from about 1 to about 12 carbon atoms; it is more preferred that $Z^1$, $Z^2$, $X^1$, $X^2$, $X^3$, and $X^4$ be bromine, that a, b, c, and d be from about 1 to about 4, and that $R^1$ and $R^2$ be alkylene of from about 1 to about 5 carbon atoms.

In this invention n is an integer of from about 1 to about 100. It is preferred that n be from 1 to about 10; in the most preferred embodiment, n is 1.

In the first step of applicant's process, a halogenated diphenoxy compound of the formula

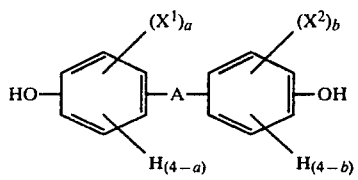

is reacted with an alkylene dihalide of the formula $X^1R^1X^2$. From about 1 to about 20 moles of alkylene dihalide are reacted with each mole of halogenated diphenoxy compound. It is preferred to react from about 2 to about 12 moles of alkylene dihalide per mole of halogenated diphenoxy compound; it is most preferred to react from about 2 to about 6 moles of alkylene dihalide per mole of halogenated diphenoxy compound.

It is preferred that the alkylene dihalide be alkylene dibromide. The most preferred alkylene dibromide is ethylene dibromide.

In this first step of applicant's process, the alkylene dihalide and the halogenated diphenoxy compound are reacted at a temperature of from about 50 to about 200 degrees centigrade for from about 30 to about 300 minutes. It is preferred to react the alkylene dihalide and the halogenated diphenoxy compound at a temperature of from about 75 to about 150 degrees centigrade for from about 60 to about 180 minutes. In the most preferred embodiment, the alkylene dihalide is reacted with the halogenated diphenoxy compound at a temperature of from about 90 to about 100 degrees centigrade for about 120 minutes.

It is preferred to conduct the first step of this process in the presence of an inorganic base selected from the group consisting of metal carbonates, metal hydroxides, and metal oxides wherein the metal is an alkali or alkaline earth metal selected from the group consisting of the first and second columns of the Periodic Table. It is preferred to use at least about 1.0 moles of base per mole of halogenated diphenoxy compound in this step; it is more preferred to use from about 1.0 to about 2.0 moles of base per mole of halogenated diphenoxy compound. The preferred alkali metals of the first column are lithium, sodium, potassium, and rubidium, with sodium and potassium being particularly preferred. Preferred alkaline earth metals of the second column are magnesium, calcium, strontium, and barium. Alkali metal carbonates give excellent results; sodium carbonate is one of the preferred bases.

It is preferred to conduct this first step of applicant's process at atmospheric pressure, although superatmospheric and subatmospheric pressures also may be used.

After the first step of applicant's process has been conducted, excess alkylene dihalide may be removed before halogenated phenol is charged. The conditions to be used for the removal are well known to those skilled in the art.

Thus, for example, if the alkylene dihalide is removed at atmospheric pressure, the reaction mixture is maintained at a temperature of at least about the boiling point of the alkylene dihalide. However, if the reaction mixture is maintained under a reduced pressure of from about 20 to about 750 millimeters of mercury absolute, then the reaction mixture may be maintained at a temperature of less than the boiling point of the alkylene dihalide. When ethylene dibromide is the alkylene dihalide, it may be removed at a temperature of from about 120 to about 140 degrees centigrade at atmospheric pressure.

The alkylene dihalide removal step is conducted until the reaction mixture contains less than about 5 percent (by weight) of alkylene dihalide. It is preferred that the reaction mixture contain less than about 1 percent (by weight) of alkylene dihalide. It is most preferred that the reaction mixture contain less than about 0.5 percent (by weight) of alkylene dihalide.

In the second step of applicant's process, the halogenated aryl ether produced in the first step is reacted with a halogenated phenol of the formula

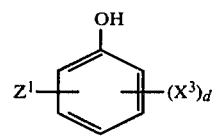

at a temperature of from about 50 to about 200 degrees centigrade for from about 1 to about 10 hours. It is preferred to react said aryl ether with the halogenated phenol at a temperature of from about 100 to about 180 degrees centigrade for from about 2 to about 6 hours. It is most preferred to conduct this reaction at a temperature of from about 140 to about 160 degrees centigrade for about five hours.

The amount of halogenated phenol which is used in this second step is preferably a function of the amount of the halogenated diphenoxy compound used in the first step of the process. It is preferred to use about 0.1 to about 2.0 moles of halogenated phenol per mole of diphenoxy compound. It is more preferred to use from about 0.5 to about 2.0 moles of halogenated phenol per mole of diphenoxy compound. In the most preferred embodiment, one should use from about 1.0 to about 2.0 moles of halogenated phenol per mole of diphenoxy compound.

The second step of applicant's process is conducted at atmospheric pressure. However, superatmospheric and subatmospheric pressures also may be utilized.

It is preferred to conduct the process of this invention in the presence of an organic solvent. The first step of this process, the second step of this process, or both steps of this process may be conducted in the presence of said solvent. When an organic solvent is used, it is preferred that it have a boiling point of greater than about 120 degrees centigrade. By way of illustration and not limitation, some suitable organic solvents include, e.g., non-fused ring aromatics such as xylene, ethyl benzene, cumene, styrol, dibenzyl, cymene, isopropyl toluene, isocymene, monobromobenzene, dichlorobenzene, and the like; lower haloalkanes and lower haloalkylenes having 1 to 6 carbon atoms such as, e.g., ethylene dibromide, pentachloroethane, tetrachloroethylene, and the like; aliphatic alcohols containing from about 5 to about 15 carbon atoms such as, e.g., methyl amyl alcohol, octyl alcohol, 2-ethyl butanol, and the like; aromatic alcohols containing from about 6 to about 15 carbon atoms such as, e.g., benzyl alcohol; dihydric aliphatic alcohols containing from about 1 to about 10 carbon atoms such as, e.g., ethylene glycol, propylene glycol, and the like; ketones containing at least about 5 carbon atoms such as, e.g., methyl butyl ketone, methyl amyl ketone, butyrone, mesityl oxide, phenyl methyl ketone, and the like; ethers containing from about 3 to about 15 carbon atoms such as, e.g., the monoethyl ether of ethylene glycol, the monoethyl ether of ethylene glycol, diethylene glycol, the monoethyl ether of diethylene glycol, the monobutyl ether of diethylene glycol, the monomethyl ether of diethylene glycol, and the like; esters containing from about 5 to about 15 carbon atoms, such as, e.g., amyl formate, hexalin formate, hexalin acetate, heptalin formate, heptalin acetate, normal butyl acetate, methyl amyl acetate, octyl acetate, 2-ethyl butyl acetate, methyl cyclohexanol acetate, benzyl acetate, ethylene glycol monoacetate, ethylene glycol diacetate, n-butyl propionate, amyl propionate, ethyl butyrate, n-butyl butyrate, ethyl hydroxy-isobutyrate, isobutyl lactate, methyl cyclohexanol lactate, and the like; dimethyl formamide, dimethyl sulfoxide; and other organic solvents known to those in the art with boiling points in excess of 120 degrees centigrade.

In another preferred embodiment, one may conduct either or both steps of applicant's process in the presence of water. When water is used as the solvent, it is preferred to conduct the reaction in the presence of a phase transfer catalyst. Any of the phase transfer catalysts known to the art may be used.

When water is used as the solvent in the second step of applicant's process, it is preferred to use a superatmospheric pressure of from about 1 to about 20 atmospheres while maintaining the reaction mixture at a temperature of from about 100 to about 250 degrees centigrade for from about 60 to about 1,800 minutes. It is more preferred to use a superatmospheric pressure of from about 1 to about 10 atmospheres while maintaining the reaction mixture at a temperature of from about 110 to about 200 degrees centigrade for from about 180 to about 1,200 minutes. In the most preferred embodiment, one should use a superatmospheric pressure of from about 2 to about 4 atmospheres while maintaining the reaction mixture at a temperature of from about 140 to about 160 degrees centigrade for from about 360 to about 600 minutes.

The following examples are provided for the purpose of further illustration only and are not intended to be limitative of the invention disclosed. Unless otherwise specified, all parts are by weight, all weights are in grams, all temperatures are in degrees centigrade, and all volumes are in milliliters.

PREPARATION OF THE ARYL ETHER FLAME RETARDANTS

EXAMPLE 1

Six-hundred fifty-two and eight tenths grams of 4,4'-isopropylidene-2,2',6,6'-tetrabromodiphenol were charged to a solution containing 1,000 milliliters of propylene glycol and 115 grams of sodium hydroxide. The solution was heated to a temperature of 90 degrees centigrade, and 1,353.6 grams of ethylene dibromide were charged. The reaction mixture was heated to a temperature of 100 degrees centigrade and maintained at this temperature for three hours. Thereafter, unreacted ethylene dibromide was removed under reduced pressure. Seven-hundred ninety-five grams of tribromophenol and 144 grams of sodium hydroxide were charged to the reaction mixture, and the reaction mixture was heated to a temperature of 150 degrees centigrade and maintained at this temperature for 3.5 hours. The reaction mixture was then cooled to a temperature of 25 degrees centigrade, and the top layer was decanted. The bottom layer was washed with water and methanol. Eight-hundred four grams of product with a softening point of about 65 degrees centigrade were obtained. This product contained 58.1 percent of bromine. Thermal gravimetric analyses of this product indicated that it lost one percent of its weight at 215 degrees centigrade, five percent of its weight at 327 degrees centigrade, and ten percent of its weight at 368 degrees centigrade.

EXAMPLES 2-5

The procedure described in Example 1 was substantially followed. The conditions used in these Examples are shown below in tabular form.

| | Example Number | | | |
|---|---|---|---|---|
| | 2 | 3 | 4 | 5 |
| Grams of 4,4'-isopropylidene-2,2',6,6-tetrabromodiphenol | 478.2 | 272 | 272 | 272 |
| Milliliters of Propylene Glycol | 1000 | 1000 | 1000 | 1000 |
| Grams of Sodium Hydroxide | 0 | 0 | 0 | 40.2 |
| Grams of Sodium Carbonate | 102.1 | 111.3 | 111.3 | 0 |
| Reaction Temperature for First Step, Degrees Centigrade | 100-120 | 90 | 90 | 95-105 |
| Reaction Time for First Step, Minutes | 180 | 120 | 120 | 240 |
| Grams of Ethylene Dibromide Charged in First Step | 328.4 | 188 | 188 | 188 |
| Grams of Tribromophenol Charged in Second Step | 589 | 330.8 | 330.8 | 330.8 |
| Grams of Sodium Carbonate Charged in Second Step | 185 | 111.3 | 111.3 | 0 |
| Grams of Sodium Hydroxide Charged in Second Step | 0 | 0 | 0 | 40.2 |
| Reaction Temperature for Second Step, Degrees Centigrade | 160 | 160 | 160 | 145 |
| Reaction Time for Second Step, Minutes | 240 | 180 | 180 | 180 |
| Grams of Product Obtained | 790 | 535 | 380 | 490 |
| Softening Point of Product Degrees Centigrade | 90 | 90-95 | 80-84 | 85-90 |
| Percent Bromine in Product | 60.1 | 58.8 | 58.2 | 61.3 |
| Temperature at which 5% Weight Loss Occurred | 353 | 397 | 373 | 372 |

In Examples 2 and 5, unreacted ethylene dibromide was not removed after step one and prior to step two. In Examples 5, after the ethylene bromide had reacted with the 4,4'-isopropylidene-2,2',6,6'-tetrabromodiphenol for 120 minutes, 27.0 additional grams of 4,4'-isopropylidene-2,2',6,6'-tetrabromodiphenol and 4.0 additional grams of sodium hydroxide were charged to the reaction mixture; thereafter the reaction mixture was maintained at a temperature of 95-105 degrees centigrade for an additional 120 minutes.

PREPARATION OF FLAME-RETARDED ACRYLONITRILE-BUTADIENE-STYRENE COMPOSITIONS

EXAMPLES 6-7

Acrylonitrile-butadiene-styrene compositions were prepared by incorporating the aryl ethers of Examples 1-5 into Borg-Warner "GSM 4500", a black base ABS resin available from the Borg-Warner Corporation which had been dried at 180 degrees Fahrenheit for 240 minutes. The aryl ether was admixed with the ABS by addition to a Brabender Prep Center Mixer ("Measuring Head", Model R6, C. W. Brabender Instruments, Inc., South Hackensack, N.J.); the mixer was equipped with a pair of roller-type blades positioned with a head provided with heat transfer means. The resultant mixture was heated to a temperature of about 220 degrees centigrade; at this temperature it was in a molten state. The formulation was discharged from the mixer, cooled, and ground into chips. The chips were injection molded in a one-ounce Newbury Injection Molder (Model HI-30 RS, Newbury Industries, Inc., Newbury, OH); a 60-second molding cycle with a ram pressure of 2,000 p.s.i. was utilized; these chips were subjected to heat, melted, and then injected into a mold in order to provide solid samples for testing.

The samples contained 19.0 percent (by weight of total composition) of the ether and 3.75 percent (by weight of total composition) of antimony trioxide. The injection molded samples were tested for Izod impact and heat distortion temperature (unannealed). They were also tested for flammability in accordance with Underwriters' Laboratory Subject No. 94 test (U. L. Tests for Flammability of Plastic Materials, U. L. 94, Feb. 1, 1974). In this test, the test specimen was supported from the upper end, with the longest dimension vertical, by a clamp on a ring stand so that the lower end of the specimen was $\frac{3}{8}''$ above the top of the burner tube. The burner was then placed remote from the sample, ignited, and adjusted to produce a blue flame $\frac{3}{4}''$ in height. The test flame was placed centrally under the lower end of the test specimen and allowed to remain for ten seconds. The test flame was then withdrawn, and the duration of flaming or glowing combustion of the specimen was noted. If flaming or glowing combustion of the specimen ceased within 30 seconds after removal of the test flame, the test flame was again placed under the specimen for ten seconds immediately after flaming or glowing combustion of the specimen stopped. The test flame was again withdrawn, and the duration of flaming or glowing combustion of the specimen was noted. If the specimen dripped flaming particles or droplets while burning in this test, these drippings were allowed to fall onto a horizontal layer of cotton fibers (untreated surgical cotton) placed one foot below the test specimen. Significantly flaming particles were considered to be those capable of igniting the cotton fibers. The duration of flaming or glowing combustion of vertical specimens after application of the test flame (average of five specimens with ten flame applications) should not exceed 25 seconds (maximum not more than 30 seconds) and the portion of the specimen outside the clamp should not be completely burned in the test.

In Example 6, the aryl ether of Example 1 was used as the flame retardant. The composition of this example had a U. L. 94$\frac{1}{8}''$ rating of V-0, a U. L. 94 1/16" rating of V-0, an Izod impact of 1.69 foot-pounds, and an unannealed heat distortion temperature of 167 degrees Fahrenheit. It exhibited only very slight bloom after having been subjected to a temperature of 150 degrees Fahrenheit for 48 hours.

In Example 7, the aryl ether of Example 2 was used as the flame retardant. The composition of this example had a U. L. 94$\frac{1}{8}''$ rating of V-O, a U. L. 94 1/16" rating of V-O, an Izod impact of 1.83 foot-pounds, and an unannealed heat distortion temperature of 172 degrees Fahrenheit. It exhibited no bloom after having been subjected to a temperature of 150 degrees Fahrenheit for 48 hours.

COMPARATIVE EXAMPLE 8

Thirteen and six-tenths grams (0.025 moles) of 4,4'-isopropylidene-2,2',6,6'-tetrabromodiphenol and 2.65 grams (0.025 moles) of sodium carbonate were dissolved in 100 milliliters of dimethylsulfoxide and charged to a 500 milliliter four-necked flask equipped with a stirring rod, thermometer, condenser, additon funnel, and heating means. Thereafter a mixture of 100 milliliters of dimethylsulfoxide and 21.9 grams of 1-(2,4,6-tribromophenoxy)-2-bromoethane were added to the reaction mixture. The reaction mixture then was maintained at a temperature of about 110 degrees centigrade for about three hours. The reaction mixture was cooled, and water was added to it. The reaction mixture was suction filtered, and a crude solid with a melting point of from about 135 to about 140 degrees centigrade was obtained. This crude solid was washed in hot acetone, suction filtered, and dried. Twenty-four grams of bis(2,4,6-tribromophenoxyethyl) tetrabromobisphenol-A ether, with a melting point of 156-158 degrees centigrade were obtained in 76 percent yield. This material contained 61.65 percent of bromine. It was subjected to thermal gravimetric analyses; it lost 25 percent of its weight at 377 degrees centigrade, 50 percent of its weight at 387 degrees centigrade, and 75 percent of its weight at 395 degrees centigrade.

The procedure described in Example 6 was substantially followed with the exception that the resin used was Marbon's B-SM 4500 ABS resin, the concentration of the flame retardant in the ABS composition was 22 percent, and the concentration of the antimony trioxide in the composition was 4.4 percent. Compounding was performed on the Brabender Plasticorder (Model PL-V150, C. W. Brabender Instruments, Inc., South Hackensack, N.J., which was equipped with a pair of roller blades) at a temperature of 220 degrees centigrade, a speed of 100 revolutions per minute, and a time of 120 seconds. The resin was first fluxed, flame retardant and antiomony trioxide were added to the resin, and the mixture was fluxed for two minutes. The ground systems were then compression molded into two 3.25"×$\frac{1}{8}$" plaques and one 5.0"×5.5"×$\frac{1}{8}$" plaque; the compression molding occurred at a temperature of 210 degrees centigrade and a force of 20 tons for five minutes. Flammability and bloom test specimens were cut from the appropriate plaques and determined in accordance with the procedure of Example 1. The composition of this invention had a U. L. 94$\frac{1}{8}$" rating of V-0 and a U. L. 94 1/16" rating of V-0. It exhibited heavy bloom after having been subjected to a temperature of 150 degrees Fahrenheit for 48 hours.

The above examples have been described for the purposes of illustration and not limitation. Many other modifications will suggest themselves to those skilled in the art; they are intended to be comprehended within the scope of this invention.

The embodiments of this invention in which an exclusive property or privilege is claimed are as follows:

1. A process for preparing a compound of the formula

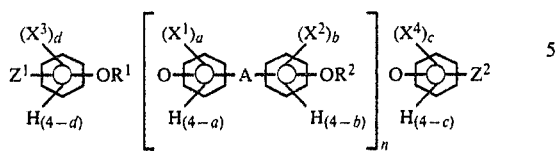

wherein $X^1$, $X^2$, $X^3$ and $X^4$ are independently selected from the group consisting of fluorine, chlorine, bromine, and iodine; n is an integer of from 1 to about 10; a, b, c, and d are each integers of from about 1 to about 4; $Z^1$ and $Z^2$ are independently selected from the group consisting of halogen and alkyl of from about 1 to about 15 carbon atoms; $R^1$ and $R^2$ are independently selected from the group consisting of alkylene containing from about 1 to about 12 carbon atoms, alkylene containing from about 2 to about 12 carbon atoms, cycloalkylene of the formula

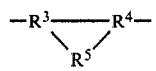

wherein $R^3$, $R^4$ and $R^5$ are independently selected from the group consisting of alkylene of from about 1 to about 5 carbon atoms, and cycloalkylenyl of the formula

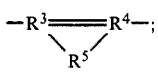

and A is selected from the group consisting of $R^3CR^4$,

and O; comprising the steps of:

(a) reacting a halogenated diphenoxy compound of the formula

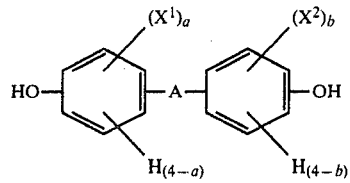

with from about 2 to about 12 moles per mole of said halogenated diphenoxy compound of an alkylene dihalide of the formula $X^1R^1X^2$ at a temperature of from about 50 to about 200 degrees centigrade for from about 30 to about 300 minutes in the presence of an inorganic base, whereby a halogenated aryl ether is produced; and sequentially (b) reacting the halogenated aryl ether produced in step (a) with a halogenated phenol of the formula

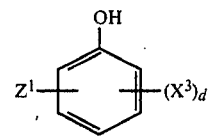

at a temperature of from about 50 to about 200 degrees centigrade in the presence of an inorganic base for from about 1 to about 10 hours, wherein from about 0.1 to about 2.0 moles of said halogenated phenol per mole of said halogenated diphenoxy compound are charged to the reaction mixture and reacted.

2. The process of claim 1, wherein n is 1 and said inorganic base is selected from the group consisting of metal carbonates, metal hydroxides, and metal oxides.

3. The process of claim 2, wherein A is $R^3CR^4$.

4. The process of claim 3, wherein $R^1$ and $R^2$ are independently selected from the group consisting of alkylene containing from about 1 to about 12 carbon atoms, and said metal is selected from the group consisting of lithium, sodium, potassium, rubidium, magnesium, calcium, strontium, and barium.

5. The process of claim 4, wherein $Z^1$, $Z^2$, $X^1$, $X^2$, $X^3$, and $X^4$ are bromine; a, b, c, and d are from about 1 to about 4; $R^1$ and $R^2$ are alkylene of from about 1 to about 5 carbon atoms; and said metal is sodium or potassium.

6. The process of claim 5, wherein $R^1$ and $R^2$ are ethylene.

7. The process of claim 6, wherein $R^3$ and $R^4$ are methyl and said base is an alkali metal carbonate.

8. The process of claim 7, wherein a, b, c, and d are 2.

9. The process of claim 8, wherein from about 0.5 to about 2.0 moles of said halogenated phenol per mole of diphenoxy compound are reacted with said halogenated aryl ether.

10. The process of claim 9, wherein from about 1.0 to about 2.0 moles of said halogenated phenol per mole of diphenoxy compound are reacted with said halogenated aryl ether.

* * * * *